United States Patent [19]
Ladbrooke et al.

[11] 3,970,927
[45] July 20, 1976

[54] METHOD AND APPARATUS INCLUDING A SENSING HEAD WITH A PAIR OF STRIP TRANSMISSION LINES FOR DETECTING METALLIC OBJECTS

[75] Inventors: Peter Howard Ladbrooke, Portsmouth; Arthur Timothy Torlesse, Chichester; John David Newman, Titchfield, all of England

[73] Assignee: Plessey Handel und Investments A.G., Switzerland

[22] Filed: Dec. 2, 1974

[21] Appl. No.: 528,995

[30] Foreign Application Priority Data
Nov. 30, 1973 United Kingdom............... 55712/73

[52] U.S. Cl.................................... 324/67; 324/3; 333/10
[51] Int. Cl.².................... G01R 31/00; G01V 3/08
[58] Field of Search............... 324/41, 67, 3; 333/10

[56] References Cited
UNITED STATES PATENTS

| | | |
|---|---|---|
| 2,242,312 | 5/1941 | Machts .................................. 324/3 |
| 3,315,155 | 4/1967 | Colani................................... 324/40 |
| 3,490,034 | 1/1970 | Marshall .......................... 324/43 R |
| 3,601,716 | 8/1971 | Bolt et al. ............................. 333/10 |
| 3,659,228 | 4/1972 | Napoli .................................. 333/10 |
| 3,742,341 | 6/1973 | Clowes et al. ..................... 324/67 X |
| 3,863,024 | 1/1975 | Caragliano et al................ 333/10 X |

*Primary Examiner*—Gerard R. Strecker
*Attorney, Agent, or Firm*—Fleit & Jacobson

[57] ABSTRACT

Apparatus, primarily for the short-range detection of metallic objects, includes a sensing head formed by a pair of strip transmission lines located in close proximity to one another and in association with a ground plane. Pulse generating means is arranged to apply pulses to one end of one strip-line, and pulse receiving means is connected to the corresponding end of the other strip-line for detecting an output pulse induced in the line. The strip-lines are terminated by their characteristic impedances, and output pulses from the said other line are characterized by any change in coupling between the lines due to the interposition between them of a material having a dielectric constant different from that of the medium surrounding the metallic objects.

10 Claims, 3 Drawing Figures

METHOD AND APPARATUS INCLUDING A SENSING HEAD WITH A PAIR OF STRIP TRANSMISSION LINES FOR DETECTING METALLIC OBJECTS

This invention relates to systems for detecting variations in the dielectric constant of structures or the contents thereof, as may be due to the presence of cavities or objects embodied in such structures. The invention is especially, but not exclusively, concerned with such systems suitable for the short-range detection of metallic objects or elements, such as metal wires buried in or enclosed by a surrounding medium of non-metallic material or of material having a dielectric constant different from that of the metallic element or object to be detected therein.

It is an object of the present invention to provide an improved method and apparatus for the short-range detection of metallic objects or elements, which is capable, at a given position of a sensing head, not only to indicate whether or not a metallic object is in the vicinity, but also to make it possible to ascertain the location and extent of such object along a sensing line provided on the sensing head. A subsidiary object is to make it possible to produce, by moving the sensing head across a surface transversely to the sensing line of the head, to obtain a two-dimensional image showing the position and shape of metal objects in the area swept by the sensing line.

According to the present invention as broadly conceived there is provided a system for detecting variations in the dielectric constant of structures as aforesaid, including a sensing head formed by a pair of strip transmission lines located in close proximity to one another and in association with a ground plane, pulse generating means for applying a pulse to one end of one of said transmission lines, and pulse receiving means connected to the corresponding end of the other line for detecting an output pulse induced in said other line an output pulse that is characterised by any change in coupling between said lines due to the interposition between them of a material having a dielectric constant different from that of the enclosing structure or material being surveyed by the sensing head.

In carrying out the invention the strip transmission lines may be parallel to one another or there may be a slight tapering of the gap between the lines towards the ends remote from the pulse generatng and pulse receiving means to take into account losses in pulse amplitude during propagation of a pulse along the line. The ends of the lines remote from the respective pulse generating and pulse receiving means will be terminated in the characteristic impedances of the line so as to avoid reflections back along the lines.

In operation of the system, as the sensing head passes over a metallic object or such object moves across the sensing head with the direction of relative movement between the sensing head and metallic object being in a direction transverse to the propagation axes of the transmission lines, a succession of pulses may be applied to one end of one line by the pulse generating means so that the pulses travel in succession along said line until they reach the point(s) where the coupling between the two lines changes as a result of the interposition of the metallic object between the two lines. This change in coupling between the lines due to a change in the dielectric constant from say air to metal, or from plaster to metal, will extend over a length of the two lines corresponding to the cross-sectional dimension of the detected object in the direction of propagation of pulses along the line. Thus, in response to the application of each of the pulses to one line, an output pulse will be induced in the other line characteristic of the change in coupling between them due to the interposed detected object. These induced pulses will be passed to the pulse receiving means for storage therein and thereafter they may be sampled at a relatively low repetition frequency for display on an oscilloscope screen so that an image of the detected object can be seen.

By way of example the present invention will now be described with reference to the accompanying drawing, in which.

Figure 1:
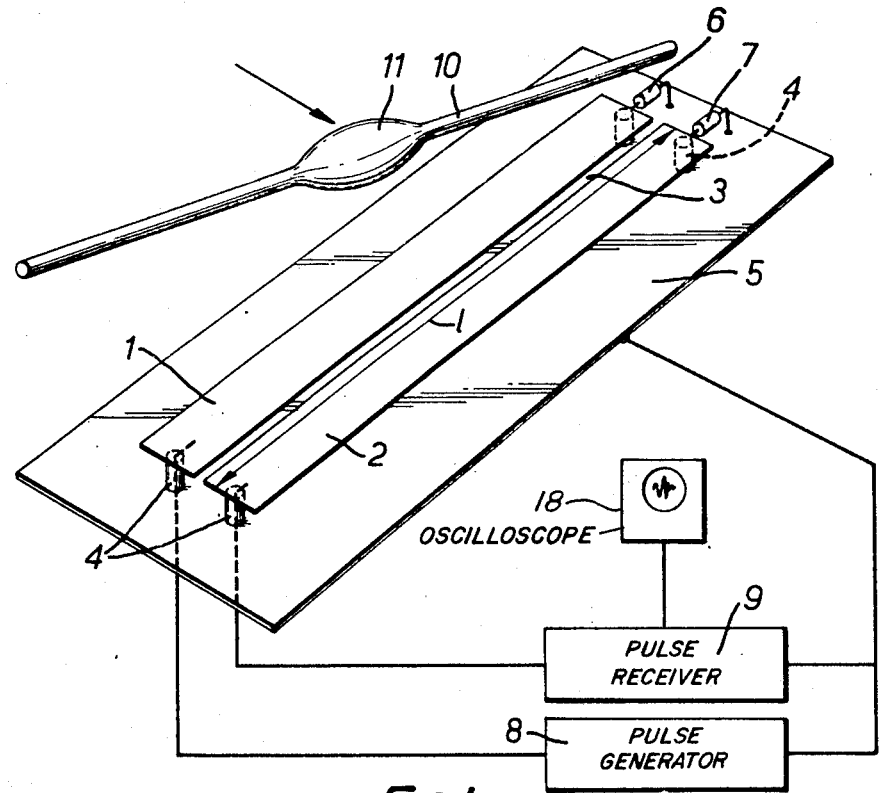
FIG. 1 is a diagrammatic perspective view of the sensing head and other parts of an object detecting system according to the invention.

Referring to the drawings, the system illustrated serves in a broad sense for detecting variations in dielectric constants of structures over which the sensing head of the system moves. Thus the system may be used for detecting cavities in walls or for detecting objects buried or enclosed in material having different dielectric constants. However, the system has especial application to the detection of enclosed or buried metallic objects or elements, such as for example power or lighting wires buried in plaster walls.

As can be seen from FIG. 1, the sensing head of the system comprises a pair of strip-line transmission lines 1 and 2, whose length may be 10 inches, and which are arranged side-by-side and substantially parallel to one another. The gap 3 between the strip-lines 1 and 2 may be of the order of ⅛ inch whilst the strip-lines, which conveniently consist of thin copper strips printed on insulated boards, may for example be of the order of 2 inches wide. The strip-lines may be mounted, as by means of insulatng pillars 4, in fixed spaced relationship with a ground plane 5 constituted by a metal sheet which is of sufficiently large surface area to afford substantial marginal overlap with the strip-lines thereby ensuring maximum interception of the electric field emanating from the strip-lines when energized. Spacing of the strip-lines from the ground plane may typically be of the order of ½ inch. Each of the strip-lines 1 and 2 is terminated at one end by a characteristic impedance element 6 and 7 connected respectively between the strip-lines and the ground plane 5.

In operation of the detecting system illustrated the strip-line 1 will have electric pulses relative to the ground plane 5 applied to it at its other end from a pulse generating equipment 8, the repetition frequency of these pusles being typically of the order of 150 KHz.

Figure 2:
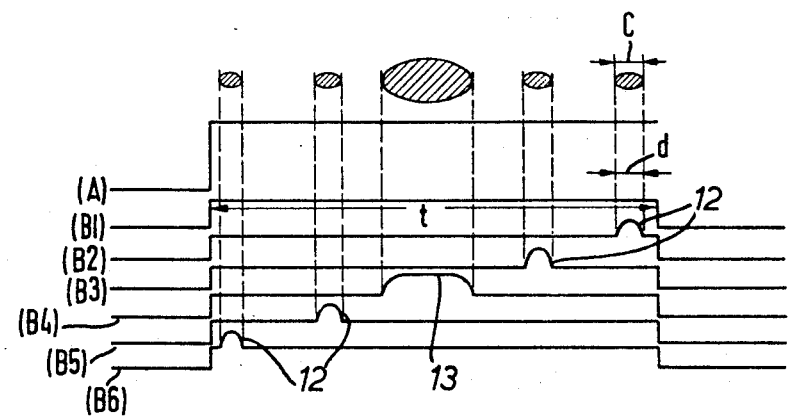
FIG. 2 is a pulse diagram showing the form of an input pulse to the sensing head and the form of output pulses fed to the pulse receiving means in response to movement of a metallic object across the sensing head; and, FIG. 3 is a diagram illustrating the build-up of an oscilloscope display of an image of the detected object.

As each of these pulses as represented at A in FIG. 2 travels along the strip-line 1, the coupling between the strip-lines 1 and 2 will cause a pulse of much reduced amplitude to be induced in the strip-line 2 and detected by a pulse receiving equipment 9. In the absence of any change in the dielectric constant of the medium interposed between the lines 1 and 2, this induced pulse may be of the form represented at B1 in FIG. 2 of the drawings in the absence of any change in dielectric constant of the medium interposed between the lines 1 and 2. However if a metallic object moves across the sensing head in the direction indicated by the arrow in FIG. 1, the electric coupling between the strip-lines 1, 2 will vary due to the interposition of the object 10 between the strip-lines. As will be appreciated from FIG. 1, the position at which the strip-line coupling changes and the duration of such changes will vary in response to the shape and movement of the object. The waveforms shown at B2 to B6 in FIG. 2 illustrate the effect of these changes in coupling between the strip-lines 1 and 2 on the output pulses received by the pulse receiving means 9, during such movement of a metallic object of the form illustrated at 10 in FIG. 1 and having a central bulbous portion 11, in response to a pulse of waveform A to a strip-line 1 with the object 10 at different positions along the path of said pulse. Above the pulse waveform A are indicated five cross sections of the object 10 taken along the line of the gap 3 between the strip-lines which are successively effective as the object moves across the sensing head in the direction indicated. The waveform B2 includes a secondary pulse 12 due to the metallic coupling between the strip-lines at a point near the impedance terminated ends. This secondary pulse 12 will have a duration (d) the ratio of which to the total pulse time (t) will be the same as the ratio between the cross-sectional dimension (c) and the length of the strip-line (1). The amplitude of the pulse 12 will depend on the distance of the object 10 from the strip-line gap in a direction normal to the plane 5 and on the dielectric constant of the object. Similar secondary pulses, also bearing the reference number 12 will be produced on the waveforms B3, B5 and B6 since in the cases of these waveforms the cross-sectional form of the object 10 where it intersects with the vertical plane through the gap 3 during movement of the object will be the same as in the case of waveform B2. The waveform B4, however, includes a secondary pulse 13 of much longer duration because, in the case of this waveform, the cross-section of the object 10 is taken through the bulbous part 11.

It can be appreciated from FIG. 2 that if the number of pulses applied to the strip-line 1 during its complete movement across the sensing head is high (e.g., 150 KHz) then the secondary pulses will define a two dimensional image of the object.

Figure 3:
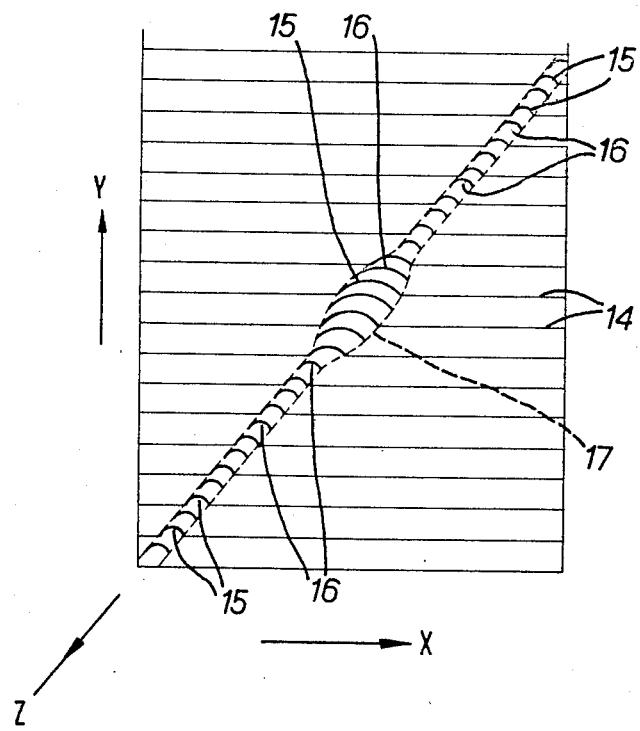

FIG. 3 illustrates one method of affording a visual display of an object on an oscilloscope 18. In this arrangement the output pulses derived from the strip-line 2 may be stored in any convenient way and then sampled at a frequency of, say 50 Hz so that one complete output-pulse waveform is displayed on the screen every 20 milliseconds. A succession of output pulses may be displayed on the screen with the pulses being displaced from one another down the screen in much the same manner as shown in FIG. 2, and with the full duration of each output pulse along the scanning lines preferably being just accommodated by the x co-ordinate dimension of the screen. It can then be arranged that the brightness of the horizontal lines 14 of the pulse waveforms is turned down and the intensity of the electron beam increased at the scanning points where secondary pulses 15 occur so that the outline of the secondary pulses 15 is clearly displayed on the screen. It may also be arranged that the number of signals 15 is made sufficiently high to obtain an image of satisfactory definition as shown in dotted form at 17.

In carrying out the invention, the movement of the head relative to the object, or vice versa, as the case may be, may be continuous or it may be incremental in accordance with the application of pulses to the sensing head.

The range of the detecting system will depend on a number of factors including inter alia the dielectric constant of the object being detected and that of the surrounding medium, the width of the strip-lines and the distance of the strip-lines from the ground plane.

As will be appreciated from the foregoing description of one embodiment of the invention, the sensing head of the system is of particularly simple and inexpensive construction and, moreover, the pulse generating and pulse receiving means of the system and the visual display equipment may be remotely located from the sensing head.

What we claim is:

1. Apparatus for the detection of local variations in the dielectric constant of a structure, which comprises: a sensing head arranged to be moved along a surface of the structure and including a single, electrically conducting ground plane, a first and second electrically conductive strip supported on one side of said ground plane, said strips being disposed in spaced-apart relationship in a common plane and in equally spaced-apart, parallel relationship with said ground plane, each of said strips forming therewith a transmission line, said strips being spaced from each other to provide an electric potential difference between said strips for producing an electric field of significant intensity substantially beyond the plane of said strips to intersect the surface of the structure along which said sensing head is moved, means for generating and applying to one end of said first strip time-spaced pulses of electric potential relative to said ground plane and potential-detector means interposed between the adjacent end of said second strip and the ground plane, said detector means being distinctively responsive to pulse potentials of different magnitudes for providing an indication of said variations in dielectric constant.

2. Apparatus as claimed in claim 1, in which the strip transmission lines extend at least approximately parallel to one another.

3. Apparatus as claimed in claim 1, in which the strip transmission lines are arranged so that the gap between the lines is slightly tapered towards the ends remote from the pulse generating and potential-detector means to take into account losses in pulse amplitude during propagation of a pulse along the line.

4. Apparatus as claimed in claim 1, in which the ends of the strip transmission lines remote from the pulse generating and potential-detector means are terminated in the characteristic impedances of the lines.

5. Apparatus as claimed in claim 1, wherein the conductive strips have each a length of about 10 inches and are spaced about ⅛ inch from each other and about ½ inch from the ground plane.

6. Apparatus as claimed in claim 1, wherein the detector means include display means line-scanning means producing a two-dimensional display on said display means each line-scan of which corresponds to the time of passage of a pulse along said transmission line so that the position, along the scanning line, of an indication of a modified secondary pulse is indicative of that point along the gap between said conducting strip at which the dielectric constant of the examined structure is modified.

7. Apparatus as claimed in claim 6, wherein the display means include an electron-beam oscilloscope having means controlled by the detector means and operative to increase the brightness of the scanning beam in response to the occurrence of a secondary pulse.

8. Apparatus as claimed in claim 7, wherein the detector means include means operative to store the received pulses, and means for sampling the stored pulses for display at a repetitive frequency lower than the frequency of the time-spaced pulses applied to said first strip.

9. Apparatus for the detection of local variations in the dielectric constant of a structure, which comprises: a sensing head arranged to be moved along a surface of the structure and including a single, electrically conducting ground plane, a first and second electrically conductive strips supported on one side of said ground plane, said strips being disposed in spaced-apart relationship in a common plane at least approximately parallel to one another and in equally spaced-apart, parallel relationship with said ground plane to form therewith a transmission line, said strips each having a length of about ten inches and spaced about one-eighth inch from each other and about one-half inch from ground plane to provide an electric potential difference between said strips for producing an electric field of significant intensity substantially beyond the plane of said strips, means for generating and applying to one end of said first strip time-spaced pulses of electric potential relative to said ground plane and potential-detector means interposed between the adjacent end of said second trip and the ground plane, the ends of said strips remote from said pulse generating and potential-detector means terminating in the characteristic impedances of the strips, and wherein said detector means includes an electron-beam oscilloscope having means controlled by said detector means and operative to increase the brightness of the scanning beam in response to the occurrence of a secondary pulse, line scanning means producing a two-dimensional display on said oscilloscope each line-scan of which corresponds to the time of passage of a pulse along said transmission line so that the position, along the scanning line, of an indication of modified secondary pulse is indicative of that point along the gap between said conducting strip at which the dielectric constant of the examined structure is modified, and wherein said detector means includes means operative to store the received pulses and means for sampling the stored pulses for display on said oscilloscope at a repetitive frequency lower than the frequency of the time-spaced pulses applied to said first strip.

10. A method for the detection of a metal object behind a surface of a structure including the steps of, providing a sensor head having two conductor strips both arranged in mutually spaced relationship at one side of a single, electrically conducting ground plane and each forming with said ground plane a transmission line, moving said sensing head with the conductor strips facing the surface across the object along the surface in a direction transverse to the propagation axes of the transmission line, applying to one end of one of said strips a succession of electric pulses to travel along said line during said head moving step whereby when one of said pulses reaches a point where the electrostatic field coupling the two conductor strips intersects a metal object, secondary pulses, characteristic of the change in coupling between the two strips due to the interposed metallic object are induced in the other strip, and sampling said induced pulses at a desired repetition frequency for display on an associated oscilloscope screen.

* * * * *